United States Patent Office 2,715,579
Patented Aug. 16, 1955

2,715,579

PREPARATION OF PRE-COOKED RICE

Robert L. Roberts, Walnut Creek, Calif., assignor to the United States of America as represented by the Secretary of Agriculture No Drawing. Application February 3, 1953, Serial No. 334,989

3 Claims. (Cl. 99—80)

(Granted under Title 35, U. S. Code (1952), sec. 266)

A non-exclusive, irrevocable, royalty-free license in the invention herein described, for all governmental purposes, throughout the world, with the power to grant sublicences for such purposes, is granted to the Government of the United States of America.

This invention relates to a preparation of novel food products from rice. In particular it relates to the conversion of ordinary rice into a completely pre-cooked, instant rice of exceptionally desirable properties and which is ready for serving in a few minutes.

Rice is used throughout the world and recognized to be a valuable foodstuff. However, the usual white rice of commerce has the disadvantage that its cooking requires considerable time and some degree of skill on the part of the cook. The point is that the rice must be cooked to such an extent as to tenderize the grains but the cooking period must not be prolonged to such an extent that the starch granules in the rice burst to produce a sticky product. Usually the proper cooking of rice involves boiling it in water for 20–40 minutes. This period of time may be considerably shortened if the rice is soaked in water prior to cooking. In any event, care is always required to avoid over-cooking thus to prevent formation of an unpalatable sticky product.

The disadvantages of ordinary rice have long been recognized and many methods have been advocated to prepare a pre-cooked, dried rice which can be stirred with hot water to produce a dish of cooked rice. These procedures involve cooking rice and then drying the cooked grains. Despite much work by skilled investigators, the fact remains that none of the prior techniques is truly satisfactory. The main difficulty is that the pre-cooked, dried products are too dense and are not completely cooked thus requiring long periods for rehydration and additional cooking so that little advantage is gained over ordinary rice. Another aspect is that in many of the known procedures the pre-cooked, dried product contains a large proportion of misshapen, broken, and checked grains. This makes the product unattractive in appearance and lowers the price it can command in the open market.

I have now found that if rice is subjected to a particular sequence of steps, as hereinafter described, the rice is converted into a product of novel and desirable properties. The product is primarily characterized by consisting of separate, whole grains which are completely pre-cooked and which are uniformly porous. These attributes of being completely pre-cooked and porous enable the product to be very rapidly prepared for the table. Thus on mixing the product with boiling water and allowing to stand for a brief period of time, i. e., about 30 seconds to 5 minutes, it is ready to eat. Inasmuch as the product is completely pre-cooked, its preparation for the table only involves absorption of water—no additional cooking is required. Accordingly, the time required for preparation for the table is much shorter than with prior products wherein additional time must be allowed for additional cooking to take place during the rehydration. Further, the product of this invention consists of grains similar in shape to the original grains but larger in volume (1.5 to 5 times the volume of the original rice), the expansion being caused by the formation of a multitude of small spheroidal voids uniformly dispersed throughout each rice grain. Additionally, when the product of this invention is rehydrated by contact with hot water, the individual grains remain separate even to a greater extent than properly cooked raw rice.

The novel products in accordance with this invention are produced as follows:

The raw, white rice is first soaked in water. It is usually convenient to use a somewhat elevated temperature to accelerate hydration of the rice grains, thus the temperature of soaking may be from about 20° C. to about 65° C. Generally the soaking is carried out for about 30–60 minutes, the aim being to increase the moisture content of the grains to their equilibrium moisture level which is usually 25 to 35%.

The soaked rice is then subjected to complete gelatinization without substantial increase in its moisture content. This is done by subjecting the soaked grains to steam for a sufficient period of time. To expedite the process, the grains are placed in an autoclave or other suitable pressure-resistant vessel and subjected to steam under pressure. It has been found that such treatment at about 10 to 15 lbs. per sq. in. gauge pressure will accomplish complete gelatinization of the grains in about 5 to 20 minutes. As mentioned above, in the steam treatment it is necessary to accomplish essentially complete gelatinization of the rice grains—this is required so that the final product will not require cooking but merely rehydration to make it ready for the table. Procedures which involve only partial gelatinization, for example gelatinization only of the external portions of the grains while leaving the interiors of the grains raw, require that some degree of cooking be applied when the final dried product is prepared for serving. In the process of this invention gelatinization is complete as to every part of every grain so that the final dry product is already in a cooked condition and thus only needs re-absorption of water to render it edible. In conducting the steaming the fact of complete gelatinization with retention of the rice as separate grains can readily be determined by well known physical and chemical tests. The use of steam to effectuate the gelatinization has the advantage that the grains can be completely gelatinized and yet they can be dried and otherwise handled while remaining as separate grains. If long-continued boiling in water were used to accomplish gelatinization, the rice would absorb so much water that the grains would become sticky and thus totally unsuited to the aim of obtaining separate pre-cooked, dried grains. Further, long-continued water cooking has the disadvantages of causing sloughing of the grains with resulting loss of valuable nutrient material.

The gelatinized rice grains are then subjected to drying at a relatively low temperature, i. e., about 35–100° C. The operation may be carried out in a tray drier but preferably a rotary drier or air suspension drier is used to keep the grains agitated thus to break up clumps and/or prevent their formation during the process. In such rotary or air suspension drier, the grains are agitated while subjected to a current of air heated to about 35° to 100° C., preferably around 50° C. This drying operation is continued until the moisture content is about 8–14%. The degree of moisture has an effect on the subsequent operation of expansion, thus the lower the moisture content within the above range, the greater will be the degree of expansion. A dried product of about 10% moisture content when subjected to the expansion will give a final product having a volume of about 4 times that of the original white rice and will thus have a porous texture whereby it will absorb water at a very rapid rate when subjected to rehydration for serving.

The expansion briefly recited above, involves taking the dried product of 8–14% moisture content and subjecting it to a stream of hot air. The rapid expulsion of residual moisture causes a puffing of the grains whereby the dense grains having about the same volume as the original raw rice and having a very low rate of rehydration are converted into porous grains which have a much greater volume than the raw rice and exhibit an extremely high rate of rehydration. The expansion or puffing as it may be called, is preferably conducted while the grains are suspended in a stream of hot air. Thus the dried, gelatinized grains are placed in a duct through which hot air is forced at such a velocity that the grains are continuously tumbled about in the air stream while they are undergoing expansion. Normally the duct is positioned in a vertical plane with the blast of hot air entering the bottom of the duct. The rice grains tumble about in the duct and gradually rise to the top of the duct as their density becomes attenuated due to expansion and expulsion of steam. A convenient apparatus of this type consists of an elongated, vertically disposed chamber provided with an inlet for hot air (at about 200–260° C.) at the bottom and an outlet for spent air and product at the top. A screen is provided near the bottom of the inlet pipe to prevent rice from entering the air inlet pipe if the air pressure drops. In using such an apparatus, the dried, gelatinized rice is placed on the screen and the hot air introduced into the chamber at such velocity that the kernels tumble about in the air stream. As the heat treatment proceeds the kernels expand uniformly and become buoyant and may be carried by the air stream out of the chamber into a separator, such as a cyclone, where the kernels are separated from the air stream. The time of residence in the hot air stream may be varied from about 10 seconds to 1 min. depending on the temperature used, the higher temperatures within the stated range of about 200–260° C. give the faster results. In any particular case the proper time for heat treatment can be determined by observing the kernels under treatment and discontinuing the heat treatment when they have reached the desired degree of expansion. As explained above, the initial moisture content of the kernels prior to expansion will determine the maximum degree of expansion which can be obtained.

The products so produced have a volume about 1.5 to 4 times that of the raw rice, they are opaque white in color, and in texture they are porous and crisp, the interior of the grains being composed of a multitude of small spheroidal voids uniformly dispersed throughout the grains. The products do not have large centrally disposed, longitudinal voids as do some of the prior art pre-cooked products. The porous, sponge-like texture of the products make their preparation for the table very simple. Thus by addition of boiling water and standing for 2 minutes, the products are ready to eat.

The following example illustrates the invention in greater detail.

One kilogram of raw white rice (Patna variety) was soaked in water at room temperature for one hour, then removed from the water and allowed to drain. The soaked rice had a moisture content of 28.5%.

The soaked rice was placed in an autoclave where it was subjected to steam at 15 lbs. per sq. in. gauge pressure for 15 min. The autoclaved rice was found to be completely gelatinized and had a moisture content of 32%.

The gelatinized rice was placed in an oven at 50–55° C. for 2 hours to obtain dried grains of 10.9% moisture content.

The dried grains were placed in air suspension heater where grains were subjected to blast of air at 250° C., the velocity of the air being high enough to suspend the grains and tumble them about. After a residence of 12 seconds, the rice kernels had expanded sufficiently and were removed.

The products were opaque white, and had a sponge-like porous texture, and had a volume of about 4 times that of the raw rice.

Samples of the product were prepared for eating by two different methods, as below. In both cases the products were scarcely distinguishable in color, taste, and separation of grains from freshly cooked rice.

*Preparation method A.*—One cup of the product was added to 2 cups boiling water and allowed to stand for 2 minutes. Excess water was then drained off and the product was ready to serve.

*Preparation method B.*—One cup of the product was added to 4 oz. boiling water and allowed to stand for 2–3 minutes, being then ready to serve.

Having thus described my invention, I claim:

1. A process of preparing dry, pre-cooked white rice in the form of porous, expanded, readily rehydratable grains which comprises soaking raw white rice in water until its moisture content is about from 25 to 35%, heating the soaked rice to completely gelatinize the starch content of the grains without substantial increase in the moisture content thereof, drying the gelatinized grains to a moisture content about from 8 to 14%, and then expanding the dried grains at an elevated temperature.

2. A process of preparing dry, precooked white rice in the form of porous, expanded, readily dehydratable grains which comprises soaking raw white rice in water until its moisture content is about from 25 to 35%, heating the soaked white rice to completely gelatinize the starch content of the grains without substantial increase in the moisture content thereof, drying the gelatinized grains at a temperature from about 35° to 100° C. to a moisture content of about from 8% to 14%, and then expanding the dried grains at a temperature about from 200° C. to 260° C.

3. A process for preparing dry, completely pre-cooked white rice in the form of porous, expanded, readily rehydratable grains which comprises soaking raw white rice in water until its moisture content is about from 25 to 35%, subjecting the soaked rice to steam under superatmospheric pressure to completely gelatinize the starch content of the grains without substantial increase in the moisture content thereof, drying the gelatinized grains at a temperature about from 35° C. to 100° C. to a moisture content about from 8 to 14%, then subjecting the dried grains to a stream of air at a temperature about from 200° C. to 260° C., the velocity of the air stream being sufficient to tumble the rice grains about and suspend them in the stream, the rapid expulsion of steam under such conditions causing the formation of a product in which a multitude of small spheroidal voids is uniformly dispersed throughout each grain of rice with resulting expansion of the grains to a volume about from 1.5 to 4 times that of the original raw rice.

References Cited in the file of this patent

UNITED STATES PATENTS

| 2,438,939 | Ozai Durrani | Apr. 6, 1948 |
| 2,610,124 | Roberts | Sept. 9, 1952 |

FOREIGN PATENTS

| 657,691 | Great Britain | Sept. 26, 1951 |